US007343554B2

(12) United States Patent
Waldorf et al.

(10) Patent No.: US 7,343,554 B2
(45) Date of Patent: Mar. 11, 2008

(54) MECHANISMS FOR SUPPORTING BACK BUTTON FUNCTION OF WEB BROWSER AS WEB SERVICE SERVER IN INTERACTION WITH BUSINESS PROCESS ENGINE

(75) Inventors: Jerry A. Waldorf, Woodland Hills, CA (US); Yanbing Lu, Arcadia, CA (US); Alex Demetriades, Pasadena, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 547 days.

(21) Appl. No.: 10/962,160

(22) Filed: Oct. 8, 2004

(65) Prior Publication Data
US 2007/0038756 A1 Feb. 15, 2007

Related U.S. Application Data

(60) Provisional application No. 60/511,612, filed on Oct. 14, 2003.

(51) Int. Cl.
*G06F 17/00* (2006.01)
(52) U.S. Cl. .................................... 715/513; 715/501.1
(58) Field of Classification Search ................ 715/513, 715/501.1
See application file for complete search history.

(56) References Cited

U.S. PATENT DOCUMENTS

| | | | |
|---|---|---|---|
| 6,430,624 B1 | 8/2002 | Jamtgaard et al. | |
| 6,772,108 B1 | 8/2004 | Li et al. | |
| 6,859,910 B2 | 2/2005 | Croy | |
| 6,925,595 B1* | 8/2005 | Whitledge et al. | .......... 715/513 |
| 7,080,092 B2 | 7/2006 | Upton | |
| 7,127,743 B1 | 10/2006 | Khanolkar et al. | |
| 2001/0056460 A1 | 12/2001 | Sahota et al. | |
| 2002/0049815 A1 | 4/2002 | Dattatri | |
| 2002/0065912 A1* | 5/2002 | Catchpole et al. | .......... 709/224 |
| 2002/0069094 A1 | 6/2002 | Bingham et al. | |
| 2002/0073119 A1 | 6/2002 | Richard | |
| 2002/0184145 A1 | 12/2002 | Sijacic et al. | |
| 2003/0093565 A1 | 5/2003 | Berger et al. | |

(Continued)

OTHER PUBLICATIONS

Srivastava, Jaideep, et al, "Survey Articles: Web Usage Mining: Discovery and Applications of Usage Patterns From Web Data", ACM SIGKDD Explorations Newsletter, vol. 1, Issue 2, Jan. 2000, pp. 12-23.*

*Primary Examiner*—William L. Bashore
*Assistant Examiner*—Laurie Ries
(74) *Attorney, Agent, or Firm*—Hickman Palermo Truong & Becker LLP

(57) ABSTRACT

This application describes systems and techniques for using a Web-service based business process to interact with a Web browser as if the Web browser were a Web service server. In one exemplary implementation, an interface module with a HTTP server is provided to convert data from the Web browser into an XML document from a Web service server and to convert data from the business process engine in an XML document to a Web service server into a Web page for the Web browser. The business process engine may be programmed in the Business Process Execution Language for Web Services (BPEL) or other suitable business process execution languages. Mechanisms for supporting the back button function in the Web browser are described for interaction between the business process engine and the Web browser.

19 Claims, 9 Drawing Sheets

U.S. PATENT DOCUMENTS

| | | |
|---|---|---|
| 2003/0120639 A1 | 6/2003 | Potok et al. |
| 2003/0222897 A1* | 12/2003 | Moore et al. ............... 345/705 |
| 2004/0030740 A1* | 2/2004 | Stelting ...................... 709/201 |
| 2004/0103396 A1 | 5/2004 | Nehab |
| 2004/0117358 A1* | 6/2004 | vol Kaenel et al. ............. 707/3 |
| 2004/0117435 A1 | 6/2004 | Rossmanith et al. |
| 2004/0220910 A1 | 11/2004 | Zang et al. |
| 2004/0230674 A1 | 11/2004 | Pourheidari et al. |
| 2004/0254979 A1* | 12/2004 | Colling et al. .............. 709/203 |
| 2005/0005259 A1 | 1/2005 | Avery et al. |
| 2005/0044197 A1* | 2/2005 | Lai ........................... 709/223 |
| 2006/0085734 A1 | 4/2006 | Balnaves |
| 2006/0155529 A1 | 7/2006 | Ludviksson et al. |

\* cited by examiner

MECHANISMS FOR SUPPORTING BACK BUTTON FUNCTION OF WEB BROWSER AS WEB SERVICE SERVER IN INTERACTION WITH BUSINESS PROCESS ENGINE

This application claims the benefit of U.S. Provisional Application No. 60/511,612 entitled "Web Browser as Web Service Server in Interaction with Business Process Engine" and filed on Oct. 14, 2003, the entire disclosure of which is incorporated herein by reference as part of the specification of this application.

TECHNICAL FIELD

This application relates generally to computer systems and networks.

BACKGROUND

Advances of computer-based information technologies have led to increasing cross communications and integrations amongst software applications, databases or data warehouses, computers, enterprise applications, and enterprise computer systems. Such communications and integrations may be implemented over various communication channels and links, including computer networks such as the Word Wide Web (the Web) or other communication mechanisms available on the Internet, and other computer communication networks.

Computer-based information technologies may be used for automation of various business processes. In general, various business operations of a business process may be defined by computer program instructions and some or all of such business operations may be automatically executed by one or more computers. The execution of certain business processes may require retrieval of data or information from other resources such as databases, and collaboration with one or more other computer business processes. Technologies and tools are needed for integrating and orchestrating a wide range of resources, trading partners and service providers to complete such a business transaction.

Web Services have been developed to facilitate communications and integrations of different resources, applications and services using various Web technologies. Web Services can be used to define uniform interfaces based on, for example, the Extensible Markup Language (XML) which is a subset of the Standard Generalized Markup Language (SGML) promulgated by the International Standards Organization (ISO). The XML provides a cross-platform approach to encoding of data and data format for both data and metadata and thus can significantly simplify the exchange of information among computer applications, computer systems, and enterprises. Web Services provide a framework for different applications to share business process logic and applications in addition to sharing of data. Web Services include a set of open standards that facilitate program-to-program interactions by specifying methods to describe, publish, discover and bind application interfaces. Web Services enable common means for discovery and invocation of services.

A Web Service may use an XML-based language, e.g., the Web Services Description Language (WSDL), to define an interface for a Web application to be available on the Web. The WSDL provides provisions that describe the location of the Web Service and the operations or methods provided by the Web Service in the XML format. A Web Service further uses a transport protocol, e.g., the Simple Object Access Protocol (SOAP), to define Web Service messages (SOAP messages) in an XML-based message format for communicating and interoperating with other Web Services.

XML-based Web Services may be implemented in different programming languages and can run on different computer operating systems. This is because an XML document uses plain ASCII text that can be understood and processed by different computer operating systems in different programming languages. In addition, a client accessing a Web Service is generally not required to have priori knowledge about the server for the Web Service. Thus, software may communicate and interact with other software via Web Services. This feature of Web Services allows for a Web Service user to access and integrate business processes, data, and functionalities provided by others via Web Services without re-creating the processes, data and functionalities. In this regard, Web Services can lead to potential new business opportunities that utilize various Web resources. Conventional Web Services may be registered, published, and discovered through, for example, a Universal Description and Discovery Integration (UDDI) Registry. The UDDI allows a user to learn about the functions of each registered Web Service and remotely invoke a desired Web service.

In particular, Web Services provide an integration platform for implementing and integrating business processes in a distributed computing environment, e.g., executing various operations or processing tasks of a single business process in different software applications on different computers. Web Services can be used to achieve universal interoperability between applications by using Web standards and to allow flexible integration of heterogeneous systems in a variety of domains including business-to-consumer, business-to-business and enterprise application integration. As an example, a business process can be carried out within an enterprise or across multiple enterprises using the Web Service Platform.

Various XML-based business execution languages have been developed or are emerging to provide a uniform and standard mechanism for defining, executing, and sharing business processes via Web Services. The Business Process Execution Language for Web Services (BPEL4WS or BPEL) is an example of such a language. More specifically, BPEL provides the formal specification of business processes and business interaction protocols and leverages existing Web Services defined in WSDL.

SUMMARY

The systems and techniques described in this application provide, among others, mechanisms for operating a business process engine to interact with a Web browser where the Web browser operates as a Web Service Server and for supporting back button function in the Web browser to undo user actions through the Web browser.

For example, a method is disclosed here for using a computer business process engine to interact with a Web browser as a Web Service server. Processing operations of a business process are described in a computer programming language to allow for directly invoking a Web service in a Web Service server. A set of predefined Web page templates that correspond to selected activities within the business process are provided to interact with a user via a Web browser and to control a page flow at the Web browser to obtain information from the user for use in the business process. A record of user actions on the Web browser is kept and one or more selected Web page templates are used to resend corresponding one or more selected Web pages to the Web browser when the user clicks the back button in the Web browser. The processing operations in the business process that are affected by the user's use of the back button on the browser are restarted again after the use of the back button.

In one exemplary system implementation, this application describes a system which include one or more machine-readable storage media that store machine-executable instructions. Such instructions are operable to cause the system to execute processes of a business workflow by directly invoking a Web service through a Web service call to the Web service. During execution of a process of the business workflow, the instructions cause the system to invoke a Web browser as a Web Service server by converting information exchanged between the business workflow and the Web browser to allow for the business workflow to use a Web service call to invoke the Web browser. The Web page flow at the Web browser is controlled according to processing activities of the business workflow.

In another exemplary system implementation, a system is described to include a business process engine and a Web server module. The business process engine has one or more executable business processes and is operable to directly interact with a Web service server in executing the business processes. The executable business processes include a first set of processes that control a sequence of Web pages at a remote browser connected to interact with the business process engine. The Web server module is in communication with the remote browser and presents the remote browser to the business process engine as another Web service server. The Web server module converts data to the business process engine from the remote browser into a Web service format from a Web service server. In addition, the Web server module converts Web service data from the first set of processes in the business process engine to the remote browser into a format that can be transmitted to and can be processed by the remote browser.

In yet another exemplary system implementation, a system is provided that has (1) a server in communication with a computer network to receive input from a Web browser in the network and to send output to the Web browser, (2) a servlet to receive a request that is generated by the server in response to a received input from the Web browser and convert the request into a document, (3) a business process engine, and (4) page templates that are predefined according to activities of the business process engine. The server has executable business processes and is operable to interact with a Web service in executing the business processes. The business process engine is operable to respond to information from the browser in the document converted by the servlet and to produce a Web service communication to the browser as if the browser were a Web service server. The business process engine sends the Web service communication to the servlet. The predefined page templates operate to convert a Web service communication from the business process engine into a Web page to the Web browser. The servlet receives and directs each Web service communication from the business process engine to a selected page template and the server directs each Web page converted by the page templates to the Web browser via the computer network.

This application also describes at least one exemplary method for converting information to and from a Web browser to make the Web browser appear as a Web service server. A hypertext transfer protocol (HTTP) request from the Web browser is converted into an Extensible Markup Language (XML) document as a Web Service message. The converted XML document is directed to a software module for Web Services which processes the converted XML document as a message from a Web Service Server and produces an XML reply for the Web Service Server. The XML reply is converted into a Web page and the HTTP is used to transmit the Web page to the Web browser.

Another exemplary method described here provides steps for using a computer business process engine to interact with a Web browser as a Web service server. Processing operations of the business process engine are described in a computer programming language to allow for directly invoking a Web service in a Web service server and to exchange information in documents. A set of predefined Web page templates that correspond to activities of the business process engine is provided to interact with a Web browser and to control a page flow at the Web browser. Each Web page template is operable to convert information from the business process engine in the documents to the Web browser into a Web page to be displayed by the Web browser. A protocol is used to transmit the Web page to the Web browser. A Web service of the business process engine is used to invoke the Web browser as a Web service server and the data from the Web browser is converted into a document from a Web service server. The converted document is directed to the business process engine to be processed as a Web service reply.

These and other examples of systems and methods are described in greater detail in the drawings, the detailed description, and the claims.

DETAILED DESCRIPTION

Figure 1:
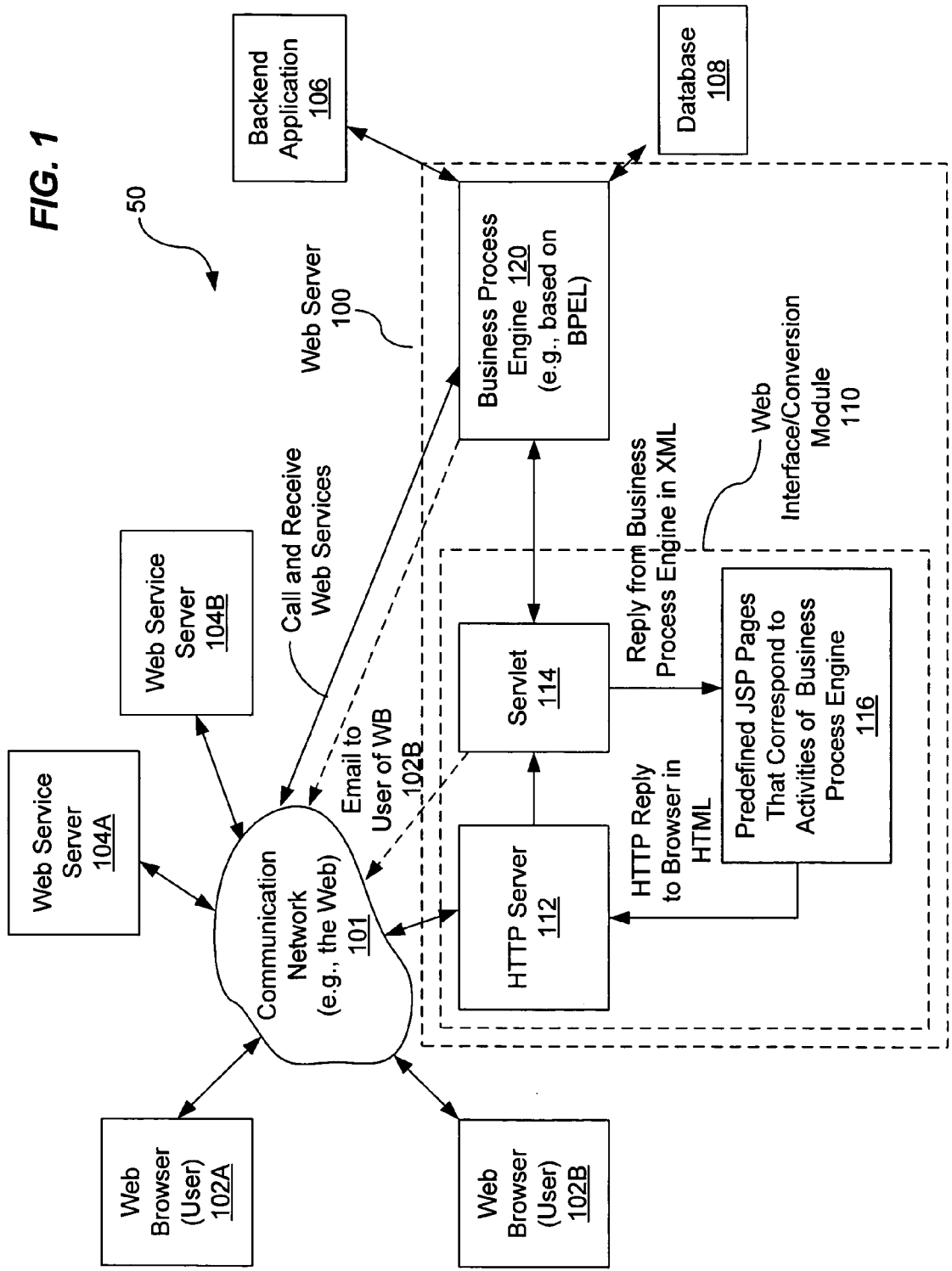
FIG. 1 shows an exemplary implementation of a system that operates a Web browser as a Web Service through a control of a business process engine.

FIG. 1 illustrates an implementation of a system 50 having a Web interface or conversion module 110 (hereinafter, Web module 110) that enables a business process engine 120 to interact with a Web browser (e.g., 102A or 102B) in a communication network 101 (e.g., the Web on the Internet or other computer networks) as if the Web browser (e.g., 102A or 102B) were a Web Service Server. As described below, the business process engine 120 is programmed to directly interact with a Web Service provided by a Web Service server (104A or 104B) connected to the network 101 without an intermediary. The business process engine 120 may contact a Web Service registry such as a UDDI registry to find a suitable Web Service before directly interacting with the suitable Web Service.

In various Web Service applications, a Web browser 102A or 102B is generally a client on the Web and is used by a user to invoke one or more Web applications provided by Web servers connected in the network 101. A Web Service on a Web Service server generally operates as a server on the Web to make a particular functionality available to others and can be invoked by others to deliver its functionality or functionalities. Therefore, in such applications, a Web browser usually does not behave like a Web Service and thus cannot be invoked by others in the network 101.

The system 50 in FIG. 1, however, uses the specially-designed Web module 110 as an intermediary to convert information exchanged between the Web browser 102A or 102B and the business process engine 120 so that the business process engine 120 can interact with a Web browser like any other Web Services in the network 101. The Web module 110 may be designed to allow the business process engine 120 to control the page flow at the Web browser 102A or 102B in accordance with the business processing steps within the business process engine 120. As illustrated, a Web server 100 may be provided to implement the business process engine 120 and the Web module 110. The Web server 100 may be implemented in one or multiple computers. As an example, the business processing engine 120 and the Web module 110 may be software applications stored in one or more computer storage devices or media and are executable by the one or multiple computers to perform the operations defined in the business process engine 120.

Exemplary implementations of various modules or components in the system 50 in FIG. 1 are now described.

The business process engine 120 may be a computer software application that describes and defines a business process, a business transaction, or a business workflow that has a sequence of processing steps or subprocesses. One or more processing steps of the business process in the business process engine 120 use information from the Web browser (e.g., Web browser 102A or 102B) to complete one or more processing tasks within the business process. In the examples described in this application, the business process engine 120 is written in a suitable XML-based business execution language that defines, executes, and shares business processing logics and functionalities via Web Services. To an extent, such a suitable XML-based business execution language can be used to define relationships between different Web Services and to compose a new application that links, integrates, or correlates with other Web Services. The use of the XML technology in a business execution language allows for universal interoperability without restrictions by any particularities of various systems such as the programming languages, the computer operating systems, and the communication protocols.

Examples of a suitable XML-based business process execution language for the business process engine 120 in FIG. 1 include but are not limited to:

(1) Business Process Execution Language for Web Services (BPEL4WS or BPEL) published at http://www-106.ibm.com/developerworks/library/ws-bpel/, (2) Web Services Conversation Language (WSCL) published at http://www.w3.org/TR/wscl10/, (3) Web Service Choreography Interface (WSCI) published at http://www.w3.org/TR/wsci/, (4) Business Process Modeling Language (BPML) published at http://www.bpmi.org/bpml.esp, (5) Business Process Specification Schema (BPSS) defined by the electronic business Extensible Markup Language (ebXML) at http://www.ebxml.org/specs/ebBPSS.pdf, (6) IBM's Web Services Flow Language (WSFL) published at http://www-3.ibm.com/software/solutions/Webservices/pdf/WSFL.pdf, and (7) Microsoft's XLANG published at http://www.gotdotnet.com/team/xml_wsspecs/xlang-c/default.htm. The exemplary implementations in this application are described with a specific reference to BPEL as the XML-based business process execution language. The use of BPEL here, however, is only an example to illustrate various features and techniques described in this application and should not be construed in any way to limit the scope of the systems and methods described in this application.

The sequence of processing steps or subprocesses in the business process engine 120 may be designed to correspond to operations for a business process. Examples of a business process include on-line stock quote services, on-line purchase services such as those provided by Aamzon.com, or a complex supply chain transaction. In the case of an on-line seller, typical processing steps may include receiving the customer order for a product, checking the inventory for the availability of the ordered product, processing the customer credit card payment for the ordered produce, requesting the shipment department to prepare the shipment of the product, and finally shipping the product to the customer.

Some of the processing steps may involve business processes or transactions that are external to the seller. For example, the seller may obtain products from one or multiple suppliers and hence may need to contact an appropriate supplier for the current pricing and availability of the particular product; many on-line sellers often use third-party credit checking services to process the credit card payments; and the shipping may also be contracted to a third party shipping company such as UPS or FedEx. Web Services and BPEL or other business process execution languages may be used to integrate third party services to the seller's business process engine 120 in the system 50 shown in FIG. 1. For example, the seller's business process engine 120 may be programmed to directly call the supplier's Web Service (e.g., 104A) without an intermediary to obtain the information on the product and to confirm the order of the on-line buyer after receiving the supplier's confirmation on the product. The engine 120 may be programmed to search for a supplier's Web Service at a Web Service registry first before the direct calling through the Web.

The business process engine 120 may also be programmed to integrate one or more backend applications 106 and one or more databases 108 in executing certain processing steps in addition to Web Services. For the on-line seller in the above example, the business process engine 120 may retrieve customer data from a customer database 108 upon receiving the customer order and take certain predetermined actions based on the received data for that particular customer. The customer database 108 may store data on customer's mailing address, past purchase records, etc. If the customer is a new customer, the business process engine 120 may act to create a new entry in the database 108 for that customer. The on-line seller may have an backend application 106 separate from the business process engine 120 to provide certain customer service functions to the business process engine 120. As an example, the seller's backend application 106 may provide billing functions to process and generate a customer bill for the customer and the business process engine 120 can deliver the generated customer bill to the customer.

Notably, the Web module 110 in the system 50 in FIG. 1 is designed to utilize the capability of directly invoking and interacting with a Web Service in the business process engine 120 to invoke and interact with Web browsers (e.g., Web browsers 102A or 102B) in the network 101. For certain applications, the business process engine 120 may call a Web browser 102A as a Web Service and interact with the Web browser 102A to obtain information from the Web browser 102A in executing one or more processing steps of the business process. In this context, the Web browser 102A is invoked by the Web server 100 though the Web module 110. Accordingly, the Web server 100 with the business process engine 120 operates as a client to request a service or functionality from the Web browser 102A while the Web browser 102A operates as a server, a Web Service Server in particular, to respond to the request by providing the requested service or functionality. Different from standard Web Services provided by the Web Service servers 104A and 104B, the Web browser 102A is a "quasi" Web Service and operates as a Web Service to the Web server 100 only through the Web module 110. Web module 110 acts as the intermediary because, conventionally, a Web Service and a Web browser use different communication protocols in their communication messages. The Web module 110 in FIG. 1 is in part designed as a "middleware" or an adapter between a Web browser and the business process engine 120 to present the Web browser as a Web Service to the business process engine 120 and to present the business process engine 120 as a typical Web application on a Web server to the Web browser.

The Web module 110 of the system 50 in FIG. 1 may be designed to expand the capabilities of the business process engine 120 from integration of Web Services, backend applications, databases, and other functionalities or resources outside the business process engine 120 to further include the integration of one or more Web browsers into the business process. The system 50 in FIG. 1, for example, may allow for a user to provide information via a Web browser to the business process engine 120 in execution of certain processing steps. For example, a user that is an expert in certain business or technology areas involved in the processing steps of the business process can be queried for a professional assessment or evaluation of a particular situation arising out of a processing step in order for the business process engine 120 to continue or complete the business process. Hence, through the Web module 110, a request from the business process engine 120 is sent to the Web browser (e.g., 102A) and is displayed on the Web browser 102A. The expert user at the Web browser 102A enters an input to the Web browser 102A and the input is sent back to the business process engine 120 through the Web module 110.

The input from the user may be in a variety of forms. In one example, the user may simply fill in one or more blank fields in a form on a Web page displayed by the Web browser 102A that is defined and controlled by the business process engine 120. The Web module 110 converts the user input in the filled form into a proper XML document for a Web Service and directs the document to the business process engine 120 for further processing. In another example, the user may use the Web browser 102A to send a document as part of or the entirety of the user input to the business process engine 120.

FIG. 1 further illustrates a detailed exemplary implementation of the Web module 110 when the network 101 is the Web on the Internet. In this specific example, the module 110 includes a HTTP server 112 for directly communicating with one or more Web browsers (e.g., 102A and 102B) on the Web 101, a Java servlet 114 programmed as a front agent for the business process engine 120 to process all exchanges between a Web browser and the business engine 120, and a set of predefined template pages 116 that are defined in the JavaServer Page (JSP) to build HMTL Web pages according to activities defined in the business process engine 120.

A Web application may be made available on the Web 101 either through a conventional Web server to allow a user to use a Web browser to invoke the Web application by a hyperlink and using the Web application by navigating through Web pages defined in the Web server. The Web pages can be described in the Hypertext Markup Language (HTML) and communicated via HTTP. Alternatively, the same Web application may be offered as a Web Service on the Web by using input and output messages in the XML documents defined in WSDL. The XML documents in WSDL are used to find, invoke, and bind the Web Service.

However, the HTML documents and XML documents in Web Services are different. The business process engine 120 in BPEL in general cannot directly invoke and integrate a Web browser as part of its processing steps. Conversely, a Web browser cannot directly communicate with the business process engine 120 in BPEL. The Web module 110 in FIG. 1 uses the servlet 114 to remove this communication barrier through a conversion between the HTML documents and XML documents. This conversion allows for communication between the Web browser and the business process engine 120.

In this regard, the servlet 114 is configured or programmed, as part of its functions, to provide the conversion from HTML documents generated by the Web browser into properly formatted XML documents for Web Services to be processed by the business process engine 120. In addition, the servlet 114 can be programmed as an intelligent agent to direct an XML document for Web Services from the business process engine 120 and to select a proper template page (e.g., JSP) among the predefined template pages 116 (e.g., JSP) for converting the document (e.g., the XML document into a HTML Web page).

In one implementation, the conversion from XML documents into HTML Web pages may be carried out by the predefined JSP pages 116. The servlet 114 and the JSP pages 116 may be programmed to dynamically build HTML Web pages "on the fly" from the XML documents generated by the business processing engine 120. Each JSP template page is programmed to parse data fields in each XML document and to compose a properly formatted HTML Web page from the parsed data fields. In this context, each JSP template page controls the content or appearance of a Web page. The HTTP server 112 then packages each HTML page from the JSP template pages 116 in a HTTP container to transmit the Web page to the Web browser (e.g., Web browser 102A) via the communication network 101 (e.g., the Web).

The JSP template pages 116 are predefined by activities in the processing steps programmed in the business process engine 120. The activities in the processing steps programmed in the business process engine 116 determine and control the sequence of the page flow and the content for each of the Web pages output by the JSP template pages 116, and the Web pages completed by and returned from the user of the Web browser. The business process engine 120 ultimately controls the page flow and page content at the Web browser. To invoke a Web browser as a Web Service, the business process engine 120 is programmed to call a JSP template page via the servlet 114. The called JSP template page produces a corresponding HTML Web page to the Web browser to obtain an user's input.

Figure 2:
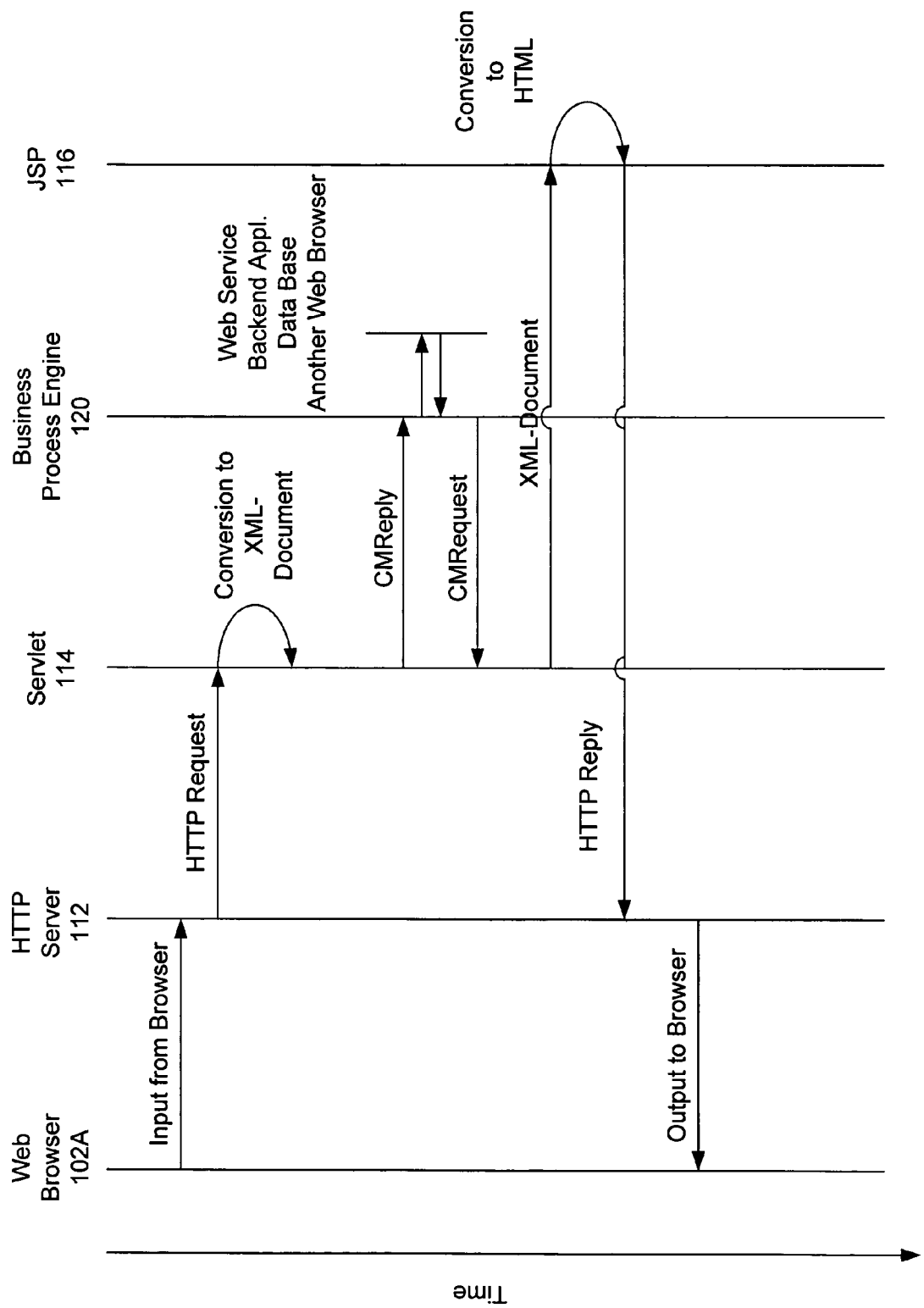
FIG. 2 shows one implementation for operating steps of the web module in FIG. 1.

FIG. 2 shows an exemplary sequence of operations of the above specific implementation of the Web module 110 in FIG. 1. Referring now to both FIGS. 1 and 2, a user input from the Web browser 102A is packaged according to a hypertext transfer protocol (HTTP) and is sent via the communication network 101 (e.g., the Web) to be received by the HTTP server 112. The HTTP server produces a HTTP request to the servlet 114 where the HTTP request contains the received user input entered into the Web browser by the user. The servlet 114 converts the data of the user input from the HTML Web page into a XML document containing the user input and sends the converted XML document in a connection map reply message (CMReply message) to the business process engine 120. The business process engine 120 processes the user input in the CMReply message and produces a response to the Web browser 102A by using a connection map request message (CMRequest message) to send the response in the XML document to the servlet 114. The servlet 114 processes the XML document to determine which Web page in the predefined page flow the XML document relates to and directs the XML document to the proper JSP template page in the JSP pages 116. The proper JSP template page operates on the XML document to compose a corresponding HTML Web page and sends it to the HTTP server 112. Finally, the HTTP server 112 transmits the HTML Web page to the Web browser 102A via the communication network 101.

The Web module 110 supports a mechanism for converting information to and from a Web browser to make the Web browser appear as a Web service server to the business process engine 120. In one implementation, a hypertext transfer protocol (HTTP) request from the Web browser is converted into an Extensible Markup Language (XML) document as a Web Service message. The converted XML document is directed to a software module for Web Services which processes the converted XML document as a message from a Web Service Server and produces a XML reply for the Web Service Server. The XML reply is then converted into a Web page. The HTTP is used to transmit the Web page to the Web browser.

In one implementation, the business process engine 120 may invoke a Web browser to request a user input for the first time by asking the user to activate a specific Web page through a hyperlink. The user may be informed of the specific Web page in various ways. For example, a telephone call to the user may be made either automatically or through an operator to give the hyperlink to the user. As another example, an electronic mail including the hyperlink may be sent to the user. This email function may be designed as part of the servlet 114 or as part of the business process engine 120. In some implementations, the request for the Web Service from the Web 101 to the Web Server 100 is received from the HTTP server 112. Upon receiving this request, the servlet 114 or the business processing engine generates and sends the email with the proper hyperlink to the expert person whose input is needed for responding to the request. The hyperlinked specific Web page is defined by one of the JSP page templates 116 as the first Web page for the user to interact with the business process engine 120. The user clicks on the hyperlink in the email or directly opens the hyperlink in the Web browser to begin the sequence of the page flow that is predefined by the logic of the business engine.

XML documents defined by the WSDL arrange tags and data in a tree-like structure in order to interact with Web Service servers. For example, a simple XML document for a Web Service on a name of "Miles Davis" may be as follows:

```
xml document:
    <root>
        <first-name>Miles</first-name><last-name>Davis</last-name>
    </root>
```

The tree structure for this document has two branches from a single root as follows:

```
              root
                    first-name
                    last-name
```

In contrast, the output data from a conventional HTML Web page entered at Web browser is a list of name-value pairs. Each pair of a name and the respective value correspond to one HTML input element. The name is the HTML element's name and the value reflects the user's input. For example, data in a HTML Web page may have the following flat list:

```
<input name="root/first-name" type="text" value="Miles>
</input>
```

Notably, the above flat list does not contain a tree structure of the XML files suitable for processing in a Web Service environment. As a result, the output from a HTML Web page cannot be properly processed by a Web Service to extract the data. In order to deduce the desired tree structure out of a flat list in a HTML Web page, naming conventions may be applied to each HTML element's name and value. For example, the following name-value pair ("root/first-name", "Miles") can be converted into the following tree structure under the naming conventions:

```
        <root>
            <first-name>Miles</first-name>
        </root>
```

As another example, the pairs ("a/b", "a/b[1]=x") and ("a/b", "a/b[2]=y") can be converted to the following:

```
        <a>
            <b>x</b>
            <b>y</b>
        </a>
```

The servlet 114 is specifically programmed to parse or decode the output flat list from a conventional HTML Web page and to arrange or map the data in the flat list of the HTML Web page into the XML tree structure in a converted XML document for Web Services by following these naming conventions. The JSP page templates 116, on the other hand, encode the data in the XML tree structure into data in a form of the flat list for a HTML document in order to be processed by a receiving Web browser.

As an example, consider a simple application where a Web browser is asked to enter the user's name and another person's name ("his name") and returns a Web page to the user displaying "Hello" to both entered names. Three JSP page templates are created for this process as further explained in FIGS. 5A and 5B. Each XML document to or from the business process engine 120 implementing this application as a business process has the following tree structure:

```
output_show_Message
    Output
        form0
            value (yourName, hisName, submit0)
```

Each JSP page template is programmed to use a naming convention for each HTML element in the input and output of the Web page used by the Web browser. For example, "his name" Web page may be described by the following HTML document:

```
<html>
<head>
</head>
<form    action="SFE"
         enctype="multipart/form-data"
         method="post"
>
Your Name
<input
         name="output_show_Message/Output/form0/yourName"
         type="text"
         value="David"
/>
What's his name?
<input
         name="output_show_Message/Output/form0/hisName"
         type="text"
         value="John"
/>
<input
         name="output_show_Message/Output/form0/submit0"
         type="submit"
         value="Say Hi"
/>
</form>
</body>
</html>
```

In this example, the JSP page template encodes the name of "hisName" HTML input element in the following format:

```
name="output_show_Message/Output/form0/hisName".
```

Here, the name of the path "output_show_Message/Output/form0/" uses names of the root and branches in the XML tree in a sequence to reflect the XML tree structure. When the user submits a filled Web page through a Web browser back to the business process engine 120, the Web page outputs the name-value pair to the HTTP server 112. For example, the output may be as follows:

```
name="output_show_Message/Output/form0/hisName"
value="John"
```

Upon receiving this output from the Web browser, the servlet 114 parses the name part of the pair and translates it into the XML tree structure. The servlet 114 uses the "output_show_Message" as the root to begin building the tree and adding branches "Output" and "form0" as it parses through the name based on the naming convention used by the JSP page templates. At the very end of the name is the field "hisName." The servlet 114 creates a data field "hisName" to accept the value of "John" output by the Web browser. This tree structure in the XML document for the output from the Web browser is graphically shown in the lower left field in the GUI in FIG. 5B.

The relevant section of a JSP page template for the "Say Hi" HTML page is shown the following:

```
Hello
<%
String temp1 = inputs.getValue("Input/form0/yourName/text",
        "[default text]");
if (temp1 != "") { %><%= temp1%>
<% } %>
and
<%
temp1 = inputs.getValue("Input/form0/hisName/text",
        "[default text]");
if (temp1 != "") { %><%= temp1%>
<% } %>
```

In this example, the JSP page template uses the above naming convention and defines the input of the "Say Hi" Web page in the following form:

```
temp1 = inputs.getValue("Input/form0/hisName/text")
        name="output_show_Message/Output/form0/hisName"
        type="text"
        value="John"
```

The servlet 114 operates to convert the output of the "His Name" HTML page into the following tree-structure XML document to the business process engine 120 as if the Web browser were a Web Service:

```
<output_show_Message>
    <Output>
        <form0>
            <yourName>
                David
            </yourName>
            <hisName>
                John
            </hisName>
            <submit0>
                Say Hi
            </submit0>
        </form0>
    </Output>
</output_show_Message>
```

FIG. 2 further illustrates that the business process engine 120 may call a Web Service, a backend application, a database, or another Web browser (e.g., Web browser 102B) when the user input from the Web browser 102A is being processed and before the response to the Web browser 102A is generated by the business process engine 120.

Figure 3:
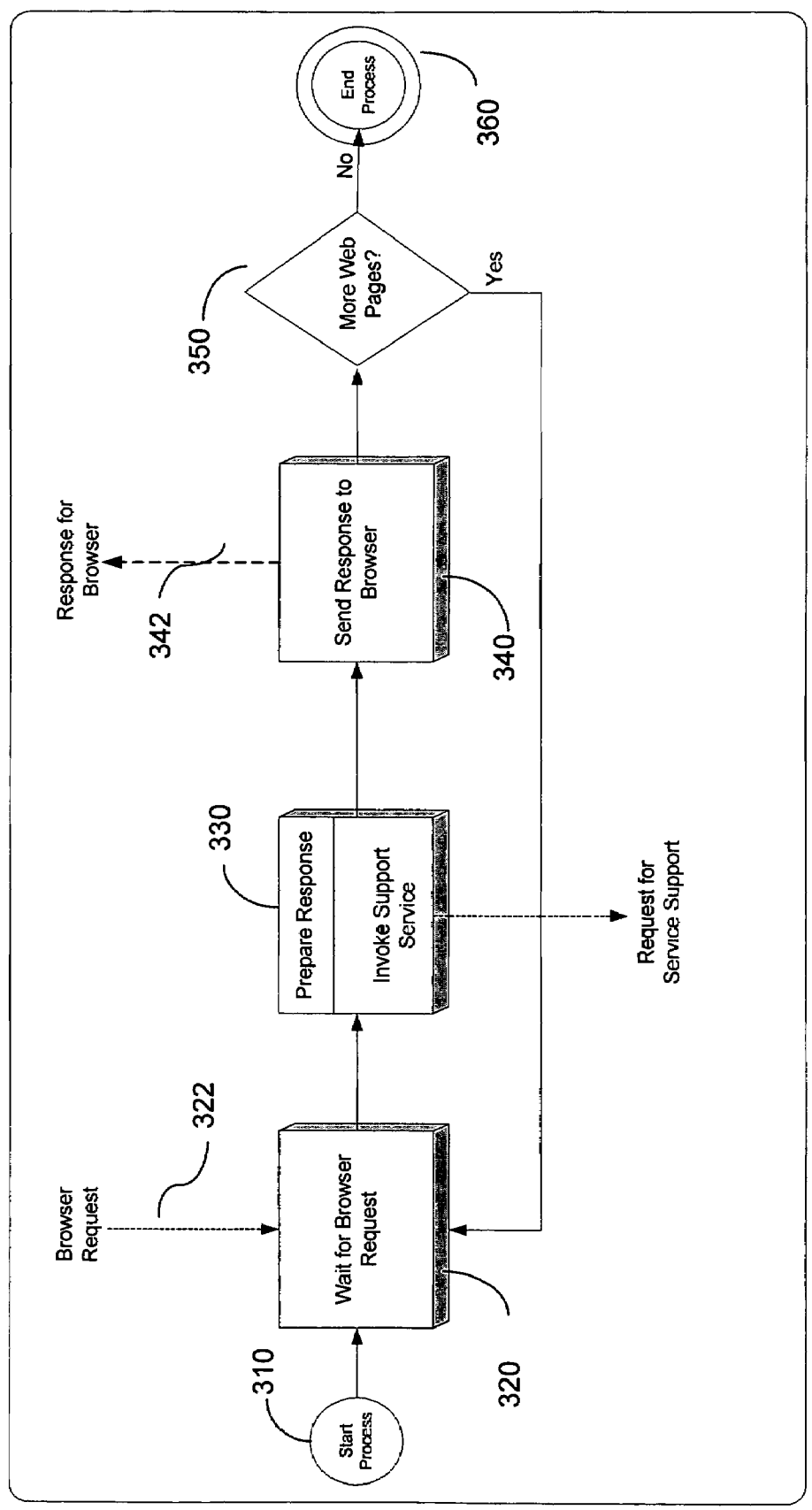
FIG. 3 shows a simple example of a sequence of processing steps of a business process that can be implemented in the system of FIG. 1.

FIG. 3 shows an exemplary flow of steps in a simple business process where the same set of activities is required for processing each single page of the Web application. The request for service support in FIG. 3 represents a call to a Web Service, a backend application, a database, or another Web browser. At step 310, the business processing engine 120 in the system 50 of FIG. 1 initiates a call for Web Services to a Web browser (e.g., 102A in FIG. 1) to start the interaction between the Web browser 102A and certain processing steps within the business process engine 120. This interaction is predefined by a set of JSP pages 116 shown in FIG. 1. Upon completing the initial call to the Web browser 102A, the business process engine 120 sends out a Web page via the JSP pages 116 in FIG. 1 at step 320 to request for certain user's input 322. At this time, the business process engine 120 waits for the user's input 322 before continuing a processing step that requires the user's input 322. After the user at the Web browser 102A enters the user input 322 in the Web page and sends the page back via the HTTP server 112 and the servlet 114, the business process engine 120 proceeds to the next processing step by using the input 322 at step 330. This step may be invisible to the Web browser 102A. During this time, the business process engine 120 may request for service support by calling another external resource such as a Web Service, a backend application, a database, or input from another user at another Web browser by using a set of JSP pages that are specifically predefined for that particular service support and are generally different from the JSP pages 116 for the Web browser 102A. At step 340, the business process engine completes the needed processing steps and sends a new Web page 342 to the Web browser 102A via another one of the JSP pages 116. At step 350, the business process engine decides whether the above interaction with the Web browser 102A is to continue and if not, it terminates the interaction at step 360.

In the above implementations of operating a Web browser as a Web Service server to a business process engine, various functions usually associated with Web browsers may be maintained. For example, Web browsers generally support "back" and "forward" buttons. The forward button allows a user to jump forward from the current Web page to a subsequent Web page that the user has visited. The back button allows the user to jump back to a previous page the user has visited prior to the current Web page. When a Web browser operates as a Web Service to a business process engine as described above, the operation of the "back" button in the Web browser represents a request from the user to undo one or more user inputs and one or more corresponding activities in the business process within the business process engine. The following sections describe mechanisms to support the back and forward buttons in executing a business process as examples.

Figure 4A:
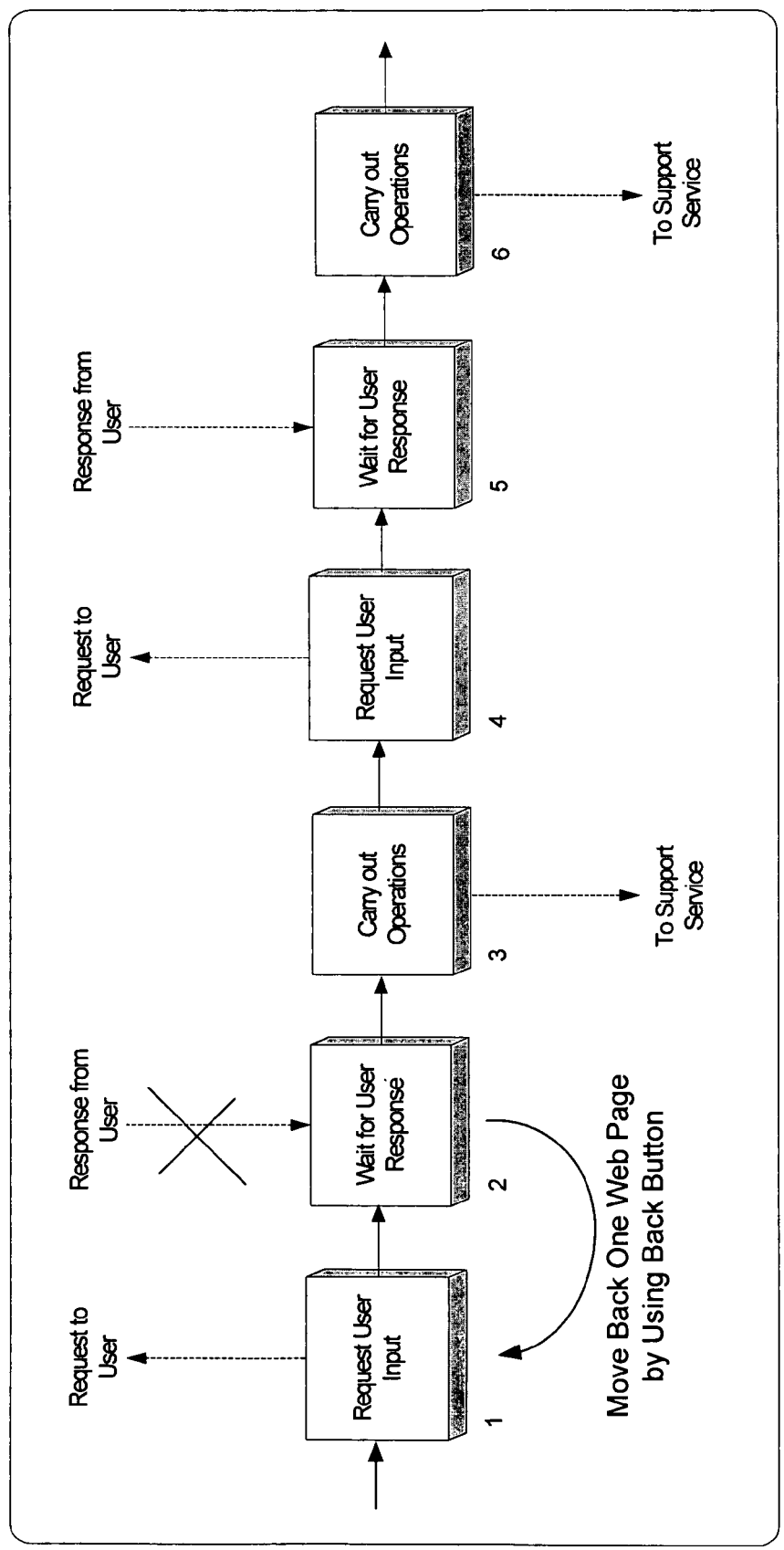
FIGS. 4A and 4B show two exemplary methods for executing a business process in the system of FIG. 1 when a back button on the Web browser is used by the user.
Figure 4B:
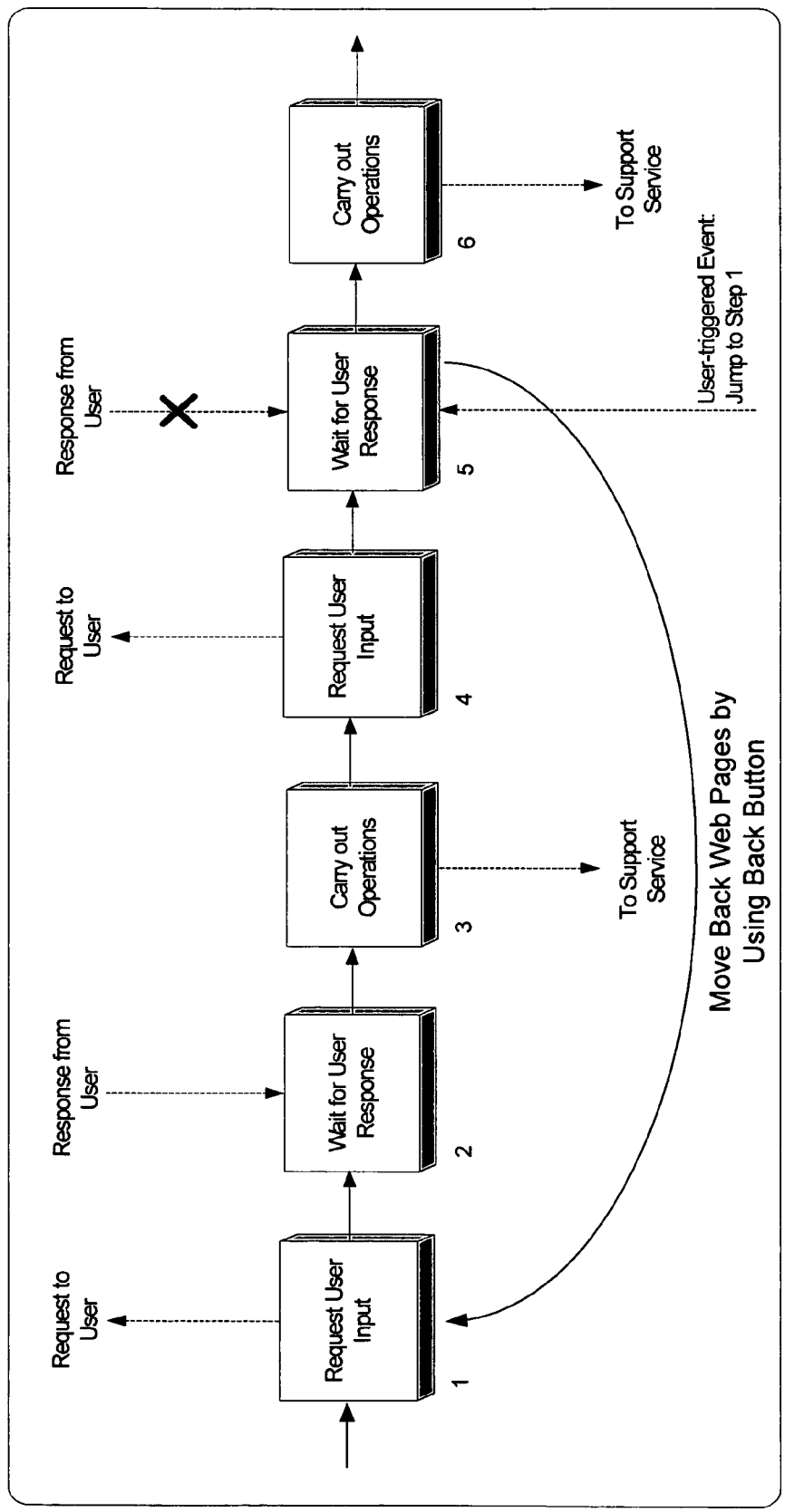

FIGS. 4A and 4B illustrate two different back button operations by the user of the Web browser 102A in a simple multiple-step business process in the business process engine 120 in FIG. 1. In FIG. 4A, the user clicks the back button at step 2 after the user enters a user input as requested by the business process engine 120 at step 1. At this time, the business process engine has yet to perform the processing in step 3 which causes a change at a support service called by step 3. The support service in step 3 may be a resource external to the business process engine such as a database, a backend application, a Web service, etc. Hence, no changes have been made outside the business process engine 120 by the processing from step 1 to step 2. In this situation, the business process engine may be programmed to resend the pages to the Web browser in response to the back button action as long as it keeps the states of the prior user Web pages.

In FIG. 4B, however, the user action of pressing the back button on the Web browser corresponds in the process model to an asynchronous event received while the process is waiting for input at step 5. As a result of receiving this event, the process stops waiting on step 5 and jumps back to step 1. Depending on the particular Web application, it might be fine that previously executed operations, like the one in step 3, still remain valid. In that case, the business process would simply resume its activities from step 1 like the situation in FIG. 4A. In other Web applications, it may be necessary to invalidate previously executed operations. In that case, even before the business process goes back to execute a previous step, a fault may be generated to trigger a compensation action on previously executed operations (step 3 in this example).

In both situations, the business process engine 120 in FIG. 1 may be configured or programmed to include a state keeping mechanism to keep state data on each action of the Web browser. This allows the business process engine 120 to know the past actions by the user and the states of the previous Web pages caused by the user actions. This state keeping mechanism may be implemented as a memory file to store the state data.

Based on the above state keeping mechanism, the business process engine 120 may be programmed to have a continuation mechanism which restarts the processing steps affected by the back button at the Web browser as if the prior actions never take place. Hence, in the example shown in FIG. 2, the business process engine 120 makes a new call to the JSP template page associated with the Web page to which the back button is directed and continues from that step. The cancelled Web pages and the user actions have been saved by the state keeping mechanism. The continuation mechanism may be used to support back button actions for multiple Web pages as long as there is no need to undo changes made to a resource outside the business process engine 120.

If, as shown in FIG. 4B, the result of the step 3 needs to be modified in order to support the back button action for going back from step 5 to step 1, the above continuation mechanism may no longer be sufficient to support the back button action. Under this situation, the business process engine 120 may need to activate or invoke a separate compensation mechanism to undo and compensate the changes in outside resources. Various business execution languages including BPEL support such a compensation mechanism. Therefore, the business process engine 120 may be programmed to include the compensation mechanism.

In implementing the system in FIG. 1, graphic user interfaces (GUIS) may be used to facilitate development of various components such as the components in the Web module 110 in FIG. 1. A developer's tool kit based on a graphic user interface (GUI) is now described. This GUI allows a developer to conveniently develop a system based on FIG. 1 for a specific application. The GUI provides graphic icons to represent different logic links, logic operations, and business processes for programming business processes or workflows. A developer can use this GUI tool kit to graphically design a business flow on the GUI with the graphic icons to represent the underlying business processing steps for the business processing engine 120. The GUI may also provide graphic icons for the developer to design a set of JSP template pages based on the activities of the business process engine 120. After the JSP pages are designed, the GUI represents the JSP pages as icons. The developer can proceed to design the business processing engine 120 on the GUI by dragging the JSP page icons and other predefined graphic icons to a design canvas on the GUI to compose the workflow for the business process engine 120. After completing the design, the developer can execute a compiling process on the GUI to check and generate the underlying codes for the business process according to a selected business execution language such as BPEL, WSCI, etc. The business process engine is ready to operate after the compiling process is completed.

Figure 5A:
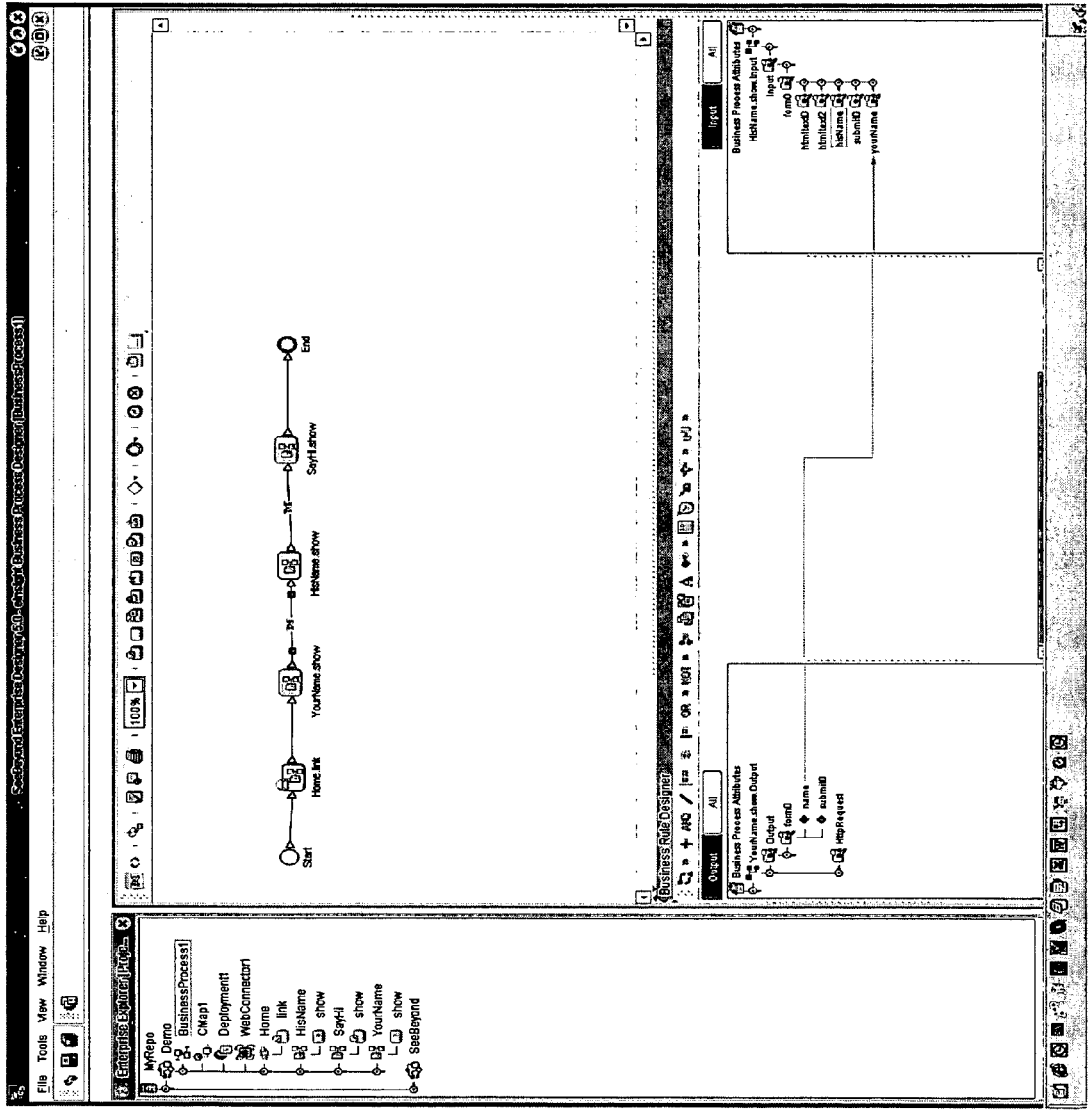
FIGS. 5A and 5B illustrate an exemplary graphic user interface (GUI) for designing a business process for the system of FIG. 1.
Figure 5B:
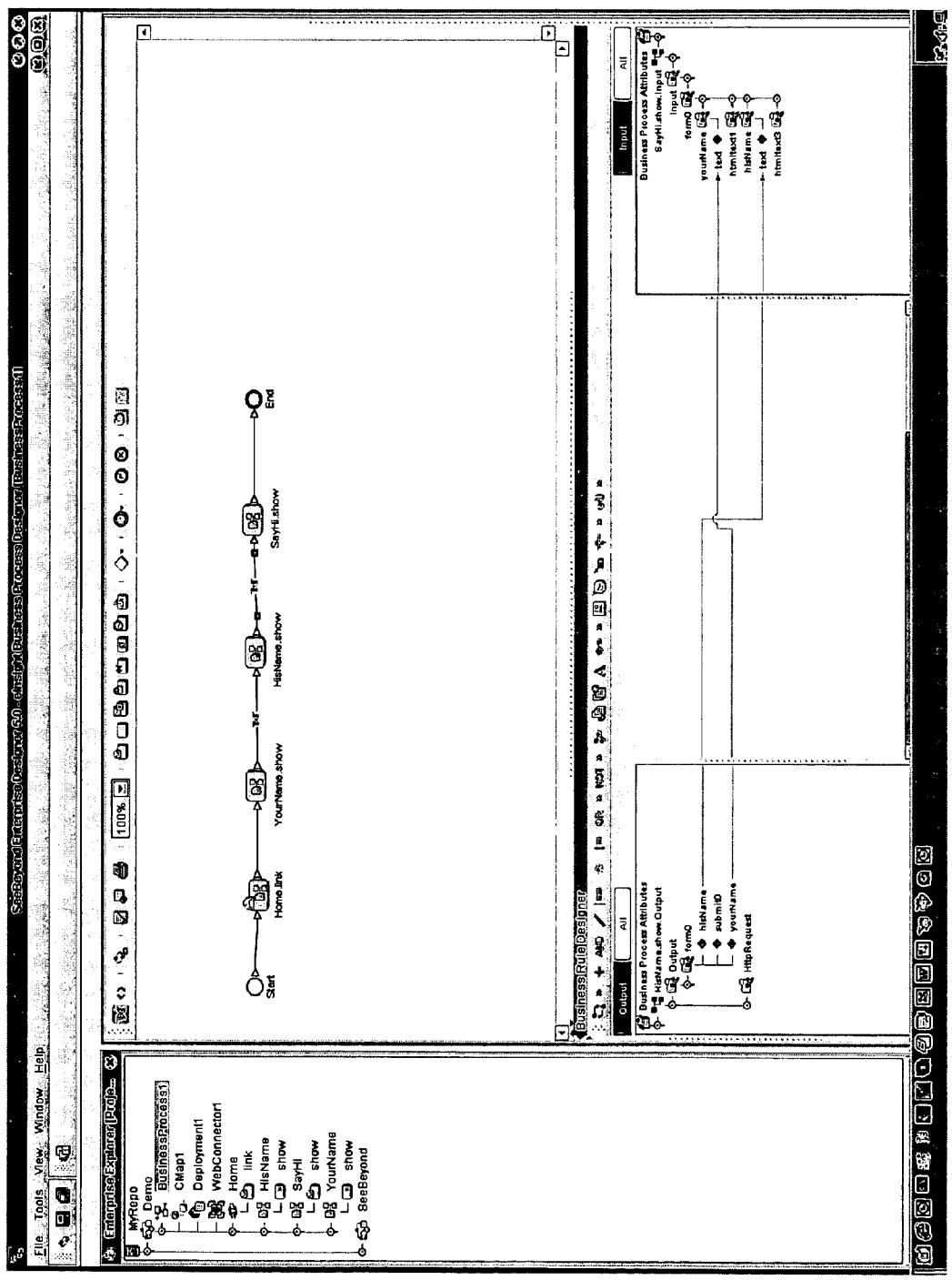

FIGS. 5A and 5B illustrate one example of such a GUI for a simple process where a Web browser is asked for the user's name and another person's name ("his name") and returns a Web page to the user displaying "Hello" to both entered names. This process has a sequence of three Web pages. The business process engine 120 in the system 50 of FIG. 1 can be programmed to control these three web pages in this example. The first page is a form "Yourname.show" for entering the user's name; the second page is a form "Hisname.show" for entering the other person's name; and the third page is a form "SayHi.show" for displaying "Hello" to two entered names in the first and second pages. A Home Link process ("Home.link") is generated for the business process engine 120 to call the Web browser. The business process engine 120 is then built by dragging the icons for the "Home.link", "Yourname.show," "Hisname.show," and "SayHi.show" into the GUI composing canvas and linking the icons according to the desired sequence flow. The lower part of the GUI graphically shows data flow between the Web pages.

FIG. 5A shows the XML tree structure for the output of the page "YourName.show" converted by the servlet 114 from an output of the Web browser and the input to the next page "HisName.show" in form of a XML document produced by the business process engine in the lower part of the GUI. The data mapping between the two Web pages is also illustrated. FIG. 5B shows the XML tree structure for the output of the page "HisName.show" and the input to the next page "SayHi.show" and their mapping relations.

The above GUI may be implemented as a GUI called "business process manager" to allow a developer to define, test and run a business process engine.

Most Web Service servers have been specially designed for Web Services. Web Services software is implemented in such servers to provide desired functions and servers in form of Web Services. Web browsers are generally used to access Web pages to send or receive information. The above techniques and systems can be used to operate a web browser as a Web Service server through a business engine. A user can use such a web browser through an interface or conversion module to respond to a Web Service request and to provide the requested service or functionality in a Web Service environment. Different from conventional or standard Web Services, such a Web browser is a "quasi" Web Service server in part because the interface and conversion module is used to make the Web Service possible through a Web browser.

Figure 6:
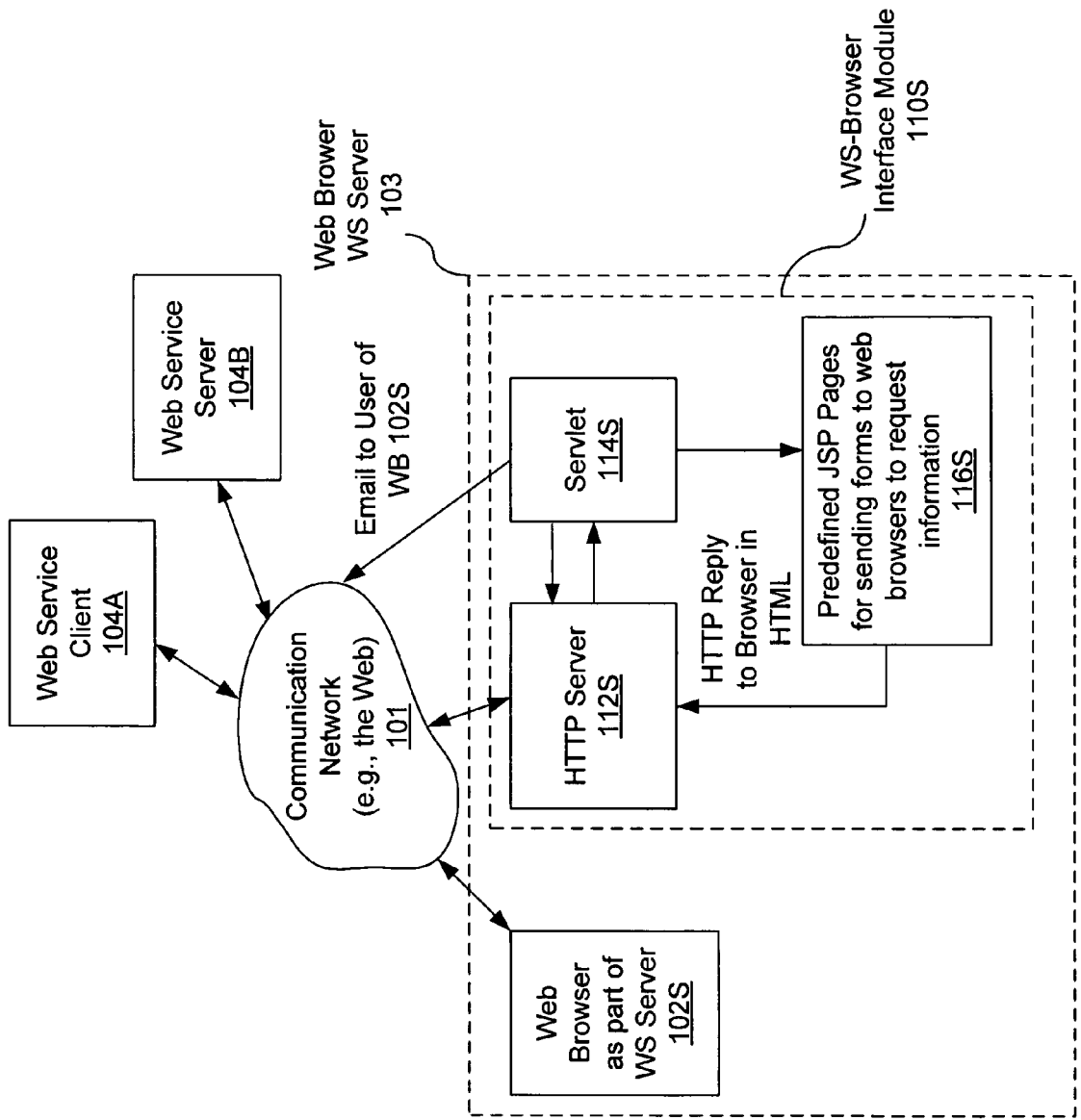
FIG. 6 shows an exemplary implementation of a system that operates a Web browser as a Web Service without a business process engine.
Figure 7:
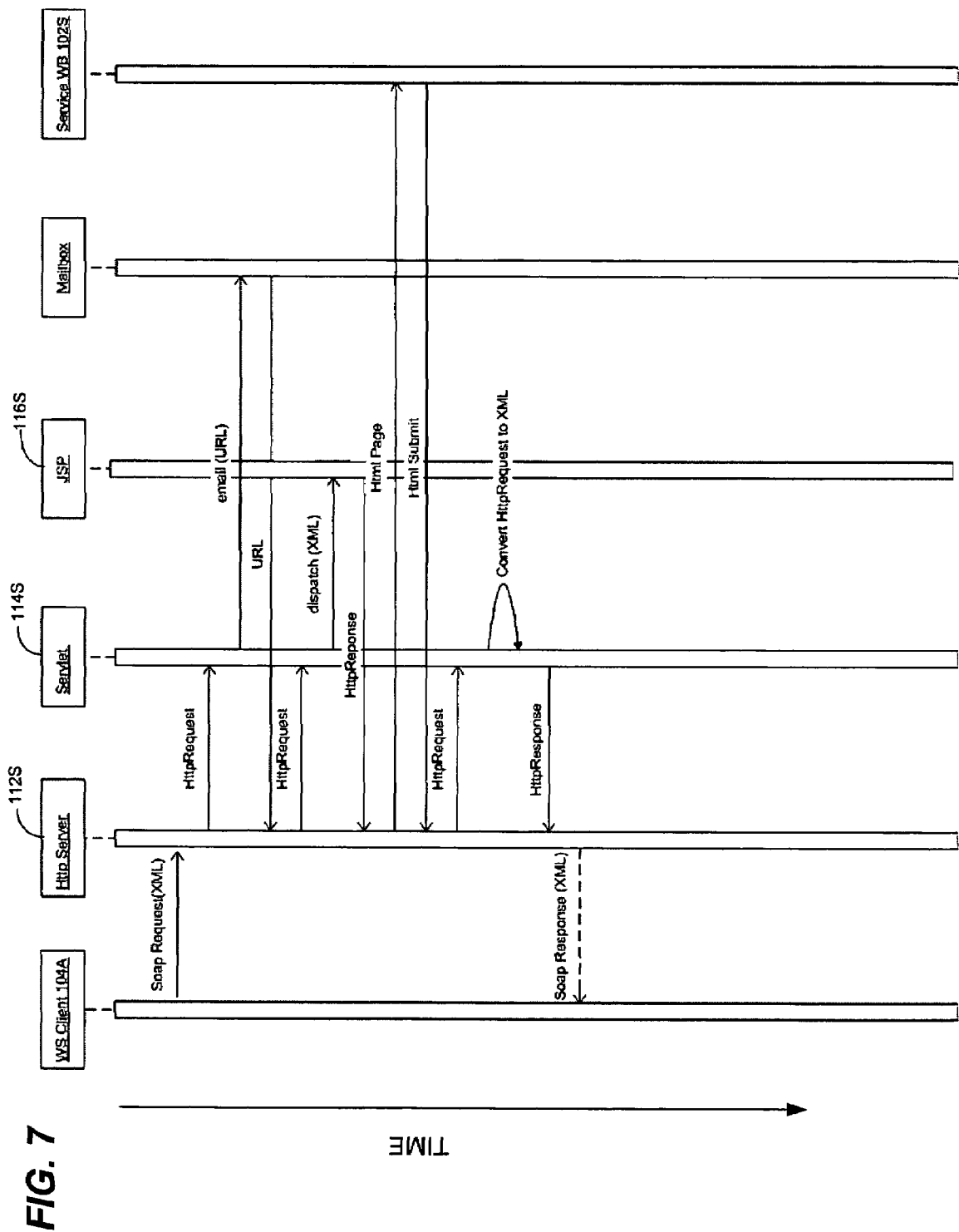
FIG. 7 shows one implementation for operating steps of the web module in FIG. 6.

Alternatively, a Web browser may be operated as a Web Service server in absence of a business process engine. FIGS. 6 and 7 illustrate one exemplary implementation of such a system.

FIG. 6 illustrates an exemplary system with an interface module 110S that allows a Web browser 102S to operate as a Web Service Server. The combination of the browser 102S and the interface module 110S functions as a Web Browser Web Service server 103. The interface module 110S is designed to describe and publish the function or service of the browser 102S as a regular Web Service on the Web 101 and enable discovery and invocation of the browser 102S as a Web Service server. As an example, the interface module 110S may allow for a user who is an expert in certain business or technology areas to provide a professional assessment, evaluation of a particular situation, or other information requested in a Web Service request to the interface module 110S. Through the interface module 110S, the request is sent to the Web browser 102S and is displayed on the Web browser 102S. The expert user at the Web browser 102S enters an input to the Web browser 102S and the input is sent back to, e.g., a Web Service server 104A or a computer on the Web 101 that makes the initial Web Service request to the interface module 110S.

The interface module 110S includes a servlet 114S, a HTTP server 112S, and predefined JSP pages 116S. The HTTP server 112S provides the communication interface between the Web Browser WS server 103 with the Web 101 and part of the communications between the browser 102S and the interface module 116S. A request for the Web Service from the Web 101, e.g., the WS client 104A, is sent to and processed by the interface module 110S. This request may be a SOAP request in an XML format. The HTTP server 112S may be used to receive the requests for the Web Service. In order to respond to the request for service, the servlet 114S sends out an email to a mailbox for the expert user who uses the browser 102S to provide the service to the request. The email includes a hyperlink to the Uniform Resource Locator (URL) address of the pages defined in JSP pages 116S. The servlet 114S may also inform the expert user of the hyperlink and ask the expert user to access the JSP pages via other means, e.g., an automatic telephone call and other electronic communication means. The expert user uses the browser 102S and the given hyperlink in the email to access the JSP pages 116S through the route from the HTTP server 112S and the servlet 114S. In response to the expert person's access, the HTTP server 112 sends a HTTP request to the servlet 114S. The servlet 114S dispatches the JSP pages 116S through the HTTP server 112S in the HTML format to the browser 102S. The expert user fills requested information in the HTML pages and sends the completed HTML pages back to the interface module 110S. The completed HTML pages are received by the HTTP server 112S and are next processed by the servlet 114S. The servlet 114S converts the responses in the HTML format into the tree structure as a XML file. The detailed description on the conversion function for converting data in HTML pages into tree-structured data for XML documents used in Web Services is described previously in connection with the servlet 114 in FIG. 1. Next, the servlet 114S sends the converted XML file to the HTTP server 112s which in turn sends the XML file as a SOAP message in XML to the requesting client 104A on the Web 101. To the client 104A, the response in the SOAP message is not different from a response in a regular Web Service response message. Therefore, the Web browser 102S acts like a Web Service server through the interface module 110S.

FIG. 7 further illustrates an exemplary sequence of operations for providing a Web Service using the system in FIG. 1. The input from the user operating the browser 102S may be in a variety of forms. In one example, the expert user may simply fill in one or more blank fields in a form on a Web page displayed by the Web browser 102S that is defined in the JSP pages 116S. The servlet 114S converts the expert user's input in the filled form in the returned HTML message from the browser 102S into a proper XML document for a Web Service and directs the document to the HTTP server 112S. In another example, the expert user may use the Web browser 102S to send a document as part of or the entirety of the user response to the Web Service request.

In implementations, the above described techniques and their variations may be implemented as computer software instructions. Such software instructions may be stored in an article with one or more machine-readable storage media or stored in one or more machine-readable storage devices connected to one or more computers. In operation, the instructions are executed by, e.g., one or more computer processors, to cause the machine to perform the described functions and operations.

Only a few implementations are described. However, it is understood that variations and enhancements may be made.

What is claimed is:

1. A method, comprising:
   describing processing operations of a business process in a computer programming language to allow for invoking a Web service in a Web Service server;
   providing a set of predefined Web page templates that correspond to selected activities within the business process to interact with a user via a Web browser and to control a page flow at the Web browser to obtain information from the user for use in the business process;
   keeping a record of user actions that pertain to the business process, wherein the user actions are communicated via the Web browser;
   using one or more selected Web page templates to resend corresponding one or more selected Web pages to the Web browser when the user clicks the back button in the Web browser, wherein clicking on the back button in the Web browser indicates that the user wishes to go back to a previous operation in the business process;
   restarting processing operations in the business process that are affected by the user's use of the back button on the browser;
   invoking a compensation mechanism in the business process to undo a change made to an external source outside the business process when the user's use of the back button on the Web browser invalidates the change made; and
   after the change made to the external source is undone, performing corresponding processing operations in the business process that are affected by the user's use of the back button on the browser.

2. A method as in claim 1, further comprising saving data of different Web pages produced by the user.

3. A method as in claim 1, further comprising:
   checking validity of each processing operation in the business process preceding the user's use of the back button on the Web browser; and
   when a prior processing operation is invalid, generating a fault to indicate the invalidity.

4. A method as in claim 1, wherein the external source outside the business process comprises a database.

5. A method as in claim 1, wherein the Business Process Execution Language for Web Services is used to describe each processing operation in the business process.

6. A method as in claim 1, wherein a computer programming language other than the Business Process Execution Language for Web Services is used to describe each processing operation in the business process.

7. A method as in claim 1, wherein the Web Services Conversation Language is used to describe each processing operation in the business process.

8. A method as in claim 1, wherein the Web Service Choreography Interface language is used to describe each processing operation in the business process.

9. A method as in claim 1, wherein the Business Process Modeling Language is used to describe each processing operation in the business process.

10. A method as in claim 1, wherein the Business Process Specification Schema (BPSS) defined by electronic business Extensible Markup Language (ebXML) is used to describe each processing operation in the business process.

11. A method as in claim 1, wherein the Web Services Flow Language is used to describe each processing operation in the business process.

12. A method as in claim 1, wherein the XLANG language is used to describe each processing operation in the business process.

13. A system, comprising:
    a server in communication with a communication network to receive input from a Web browser in the network and to send output to the Web browser;
    a servlet to receive a message that is generated by the server in response to a received input from the Web browser and convert the message into a Web service document;
    a business process engine configured to implement a business process and operable to interact with one or more Web services in executing the business process, the business process engine operable to respond to information from the Web browser in the Web service document converted by the servlet and to produce a Web service request to the Web browser as if the Web browser were a Web service server, wherein the business process engine sends the Web service request to the servlet;
    a plurality of page templates that are predefined according to activities of the business process and operate to convert a Web service communication from the business process engine into a Web page to the Web browser, wherein the servlet receives and directs each Web service communication from the business process engine to a selected page template, and wherein the server directs each Web page converted by the page templates to the Web browser via the computer network;
    a memory to keep a record of user actions that pertain to the business process, wherein the user actions are received via the Web browser; and
    means for resending one or more selected Web pages to the Web browser when the user clicks the back button in the Web browser, wherein clicking the back button in the web server indicates that the user wishes to go back to a previous operation in the business process, wherein the business process engine is configured to restart processing operations in the business process that are affected by the user's use of the back button on the browser, and wherein the business process engine comprises a compensation mechanism operable to undo a change made to an external source outside the business process when the user's use of the back button on the Web browser invalidates the change.

14. A system as in claim 13, wherein the business process engine further comprises an interface with a backend application, and is operable to execute a function provided by the backend application.

15. A system as in claim 13, wherein the business process engine further comprises an interface with a database and is operable to retrieve data from the database.

16. A system as in claim 13, wherein the business process engine calls a predetermined Web service in the network as part of implementing the business process.

17. An article comprising one or more machine-readable storage media that store machine-executable instructions operable to cause one or more computers to:

- invoke a Web service through a Web service call to the Web service to execute at least a portion of processes in a business workflow;
- during execution of a process in the business workflow, invoke a Web browser as a Web service server by converting information exchanged between the business workflow and the Web browser to allow for the business workflow to use a Web service call to invoke the Web browser;
- control a Web page flow at the Web browser according to processing activities of the business workflow;
- keep a record of user actions that pertain to the business workflow, wherein the user actions are communicated via the Web browser;
- resend one or more selected Web pages to the Web browser when the user clicks the back button in the Web browser, wherein clicking on the back button in the Web browser indicates that the user wishes to go back to a previous operation in the business workflow;
- restart processing operations in the business workflow that are affected by the user's use of the back button on the browser;
- undo a change made to an external source when the user's use of the back button on the Web browser invalidates the change made; and after the change made to the external source is undone, perform processing operations in the business process that are affected by the user's use of the back button on the browser.

18. An article as in claim 17, wherein the machine executable instructions further cause one or more computers to save data of different Web pages produced by the user.

19. An article as in claim 17, wherein the machine executable instructions further cause one or more computers to:

- check validity of each processing operation in the business workflow preceding the user's use of the back button on the Web browser; and
- when a prior processing operation is invalid, generate a fault to indicate the invalidity.

* * * * *